Dec. 31, 1963     W. K. JONES     3,115,701
METHOD FOR INSTALLATION OF SEALING RINGS
Filed Sept. 1, 1960     2 Sheets-Sheet 1

INVENTOR.
W. K. JONES
BY
ATTORNEY

Dec. 31, 1963   W. K. JONES   3,115,701
METHOD FOR INSTALLATION OF SEALING RINGS
Filed Sept. 1, 1960   2 Sheets-Sheet 2

INVENTOR.
W. K. JONES
BY
ATTORNEY

United States Patent Office 3,115,701
Patented Dec. 31, 1963

3,115,701
METHOD FOR INSTALLATION OF SEALING RINGS
Warren Kent Jones, Ponca City, Okla., assignor to Continental Oil Company, Ponca City, Okla., a corporation of Delaware
Filed Sept. 1, 1960, Ser. No. 53,518
1 Claim. (Cl. 29—453)

This invention relates to a method of installing an elastic annulus upon a cylindrical body. More particularly, but not by way of limitation, the present invention relates to a method of applying a plurality of O-rings to a cylindrical valve spool which is characterized by a plurality of spaced circumferential flanges.

In various mechanical constructions, it is frequently necessary to install an elastic or resilient annulus concentrically upon a cylindrical member whose outside diameter is larger than the inside diameter of the elastic annulus in its relaxed state. A typical example of this type of construction is encountered in the conventional spool valve. Such valves are generally characterized by a valve body having an axial bore extending therethrough for receiving a cylindrical spool. A plurality of radial ports usually extend from the outer surface of the valve body to the axial bore, and a major portion of the length of the valve spool is of lesser diameter than that of the bore so that a space is provided between the spool and the walls of the bore which permits the radial ports to be placed in communication with each other.

In order to permit two or more of the radial ports to be selectively placed in communication with each other and simultaneously isolated from other radial ports, the interstice existing between the spool and the walls of the bore is frequently partitioned into several spaces by means of a plurality of spaced, elastic annuluses pressed over the spool and forming a seal between the spool and the walls of the bore. The elastic annuluses are frequently in the form of O-ring seals of rubber but may suitably be other types of material of sufficient elasticity to tightly grip the periphery of the cylindrical spool. In order to maintain the sealing rings in their proper position relative to the longitudinal axis of the spool, a pair of circumferential flanges projecting outwardly from the periphery of the spool are often provided on each side of each of the sealing rings.

In order to install the sealing rings in their proper position upon the valve spool, the rings must first be expanded sufficiently to permit them to be passed over the enlarged end portions of the spool, and also over any intervening circumferential flanges of the type described which are located between the end of the spool and the positions which the sealing rings are to assume. It will be apparent that if the diameter of the elastic sealing ring in its relaxed state is considerably less than the diameters of the largest portions of the spool over which it must pass in being installed, manual installation may be extremely difficult and time-consuming. There is also danger of permitting the fingers, or portions thereof, to be pinched between the elastic sealing ring and portions of the spool as the rings are being installed.

It is frequently the practice, in installing sealing rings upon an elongated cylindrical spool or valve plunger, to first install a relatively soft elastic ring, such as rubber, around the body of the spool, and then to apply a resilient ring of considerable hardness concentrically around the soft elastic inner ring. The outer ring is termed a glide ring. The purpose of this "composite" sealing ring arrangement is to provide a ring which will tenaciously grip and seal against the periphery of the spool, but which will, at the same time, present a hard surface to the surrounding walls of the valve bore so that frictional wear of the ring seals will be minimized. This is especially important in spool valves which have a plurality of radial ports which intersect the axial bore at a right angle, since the intersections of such ports with the axial bore present sharp edges which would rapidly cut away portions of such soft materials as rubber.

Moreover, if a thermoplastic material having a low coefficient of friction and, consequently, inherent "self-lubricating" properties, is utilized as the outer or glide ring, resistance to the movement of the spool or plunger in the valve body is decreased, and the operating life of the valve is extended. It has been found that a material which is well suited for glide ring construction is polytetrafluoroethylene, commonly sold under the trade name Teflon. Teflon has a relatively low coefficient of friction, is, of course, much harder than the rubber usually employed in the internal elastic sealing ring, and is sufficiently resilient to afford a continuing seal between the inner elastic ring and the walls of the valve bore.

From what has been said above regarding the difficulties encountered in manually installing elastic sealing rings upon such mechanical elements as valve spools or plungers, it will be apparent that these difficulties are greatly intensified when it is proposed to install composite sealing rings comprising an inner ring of a soft, elastic material, such as rubber, and an outer ring of relatively hard, resilient material such as Teflon or other suitable thermoplastic. Not only must the elastic inner rings be expanded over portions of the spool having a larger diameter than that of the ring in its relaxed state, but once the inner rings of elastic material are in place, the outer rings of Teflon must be expanded sufficiently to pass over the enlarged portions of the valve spool and also to encircle the inner rings of soft elastic material. Even after the thermoplastic material has been expanded sufficiently to permit it to be passed over the enlarged portions of the valve spool and over the inner sealing ring which it is to encircle, the thus expanded glide ring is characterized by a relatively low rate of restoration to its relaxed dimensions, and thus a considerable time is required for the outer thermoplastic ring to contract to its original relaxed dimension. Of course, this in turn means that the valve spool or plunger cannot be utilized until the outer plastic ring has shrunk sufficiently to tightly engage the inner ring of soft elastic material and to reach an outside diameter sufficiently small to permit the valve spool to be reinserted in the valve body in which it is to function.

The present invention contemplates a novel method of installing elastic sealing rings upon a cylindrical body rapidly and easily. The method is especially well suited for the installation of a plurality of elastic sealing rings upon a valve plunger or spool which has an external periphery of varying diameter and which is adapted to receive the several sealing rings at spaced intervals along its length. By the method of the invention, the elastic rings to be installed are first radially expanded to increase their diameter. The force required to effect such expansion is diminished by utilizing the principle of the inclined plane in the form of a generally conically-shaped body over which the rings are pressed. The rings are first placed over the apex of the conical body in a sequence which is inverse to the order in which they are to be installed upon the valve spool or plunger. They are then forced toward the base of the conical body. After having been expanded a sufficient extent, the rings are slipped easily off the larger end of the conical body onto a cylindrical body without permitting the rings to contract. The cylindrical body onto which the rings are thus pushed has an axial bore therethrough of sufficient size to permit the valve spool upon which the rings are to be installed to be inserted therein.

After all of the rings have been transferred from the conical body to the hollow cylindrical body, the valve spool is inserted in the bore of the cylindrical body a sufficient distance to bring the end of the cylindrical body adjacent the position upon the spool which the first ring is to occupy. The first ring is then slipped off of the cylindrical body onto the valve spool, and due to its elastic nature will, of course, contract to resiliently engage the periphery of the valve spool. The spool and the cylindrical body are then shifted relatively to each other to bring the end of the cylindrical body adjacent the position which the next ring is to occupy on the spool. The process of transferring the elastic ring from the cylindrical body to the valve spool is then repeated. The repositioning and transfer of the elastic rings are repeated until all of the rings have been appropriately located upon the valve spool.

When it is desired to utilize composite sealing rings of the nature described above, that is, a sealing ring comprising an inner ring of soft elastic material and a glide ring of resilient, relatively hard material, the elastic rings of soft material and the relatively hard glide rings will be alternately placed over the apex of the conical body and will thus ultimately assume a position on the cylindrical body corresponding to the sequence of their installation upon the valve spool.

The novel method of the present invention is performed with a tool especially well adapted to meet the particular problems encountered in installing sealing rings upon a valve plunger or spool. It is frequently necessary, as has been indicated above, to install a plurality of such rings upon a single valve spool. The tool therefore provides a cylindrical sleeve for receiving the rings from the generally conical body which is of sufficient length to accommodate as many rings as may be necessary in the types of valve spools or plungers most frequently encountered. Moreover, the cylindrical body is provided with an abutment or shoulder to assure the retention of the elastic rings upon the cylindrical body until they are pushed off one end thereof onto the valve spool.

Another important feature of the ring installation tool of the invention is that portion of its structure which permits it to be utilized in compressing plastic glide rings around the soft elastic inner rings immedately after they have been concentrically positioned thereon. By utilizing the tool of the invention, it thus becomes unnecessary to wait extended periods of time for the plastic glide rings to constrict before relocating the valve spool in the valve body.

It is a major object of the present invention to provide a novel method of installing elastic rings upon a generally cylindrical body in a more expeditious and safer manner than has previously been possible.

Another object of the present invention is to provide a method of using a tool which permits the rapid and efficient installation upon cylindrical valve spools of composite sealing rings which consist of an inner ring of elastic, relatively soft material, and an outer ring of resilient, relatively hard material which is characterized in being substantially slower in recovering from deformation than is the inner ring.

A further object of the present invention is to provide a method which may be utilized for installing sealing rings having an outer portion of thermoplastic material, and which may be further utilized to compress the thermoplastic material after it has been expanded to an enlarged diameter.

An additional object of the present invention is to provide a method of installing a plurality of sealing rings upon cylindrical mechanical elements which are characterized in having a plurality of such rings, which tool is of simple and rugged construction, and is characterized by a long and trouble-free operating life.

These objects and advantages will be better understood, and others will become apparent, from a reading of the following specification, when considered in conjunction with the accompanying drawings which illustrate my invention.

Figure 1:
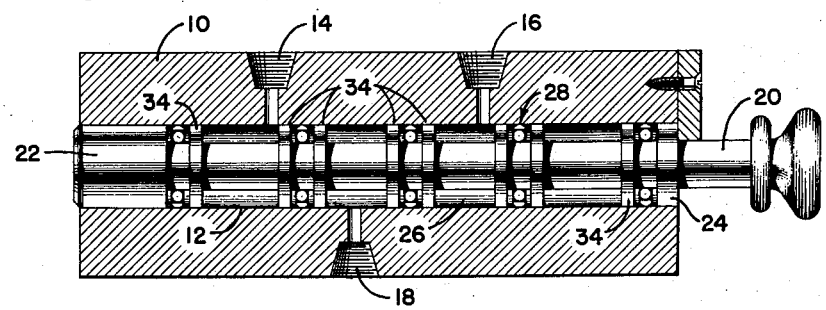
FIGURE 1 is a view in section taken through the center of a typical spool valve and showing the spool in elevation.

Referring now to the drawings, and particularly to FIG. 1, reference character 10 designates the body of a spool valve. The body 10 is characterized by an axial bore 12 which extends therethrough, and by a plurality of radial ports 14, 16 and 18 which communicate with the axial bore 12. An elongated cylindrical spool 20 of smaller diameter than the bore 12 is characterized by enlargements 22 and 24 which are of a size to form a sliding fit in the bore 12 of the valve body 10. The space 26 existing between the periphery of the valve spool 20 and the walls of the valve bore 12 is partitioned into a plurality of smaller spaces by a series of composite sealing rings designated generally by reference character 28. As may be seen well in FIG. 2, each of the composite sealing rings 28 comprises an inner ring 30 of elastic, relatively soft material such as natural or synthetic rubber, and a glide ring 32 of a resilient, relatively hard material such as a high density synthetic resin. The composite sealing rngs 28 are retained in fixed longitudinal relation to the spool 20 by means of a pair of circumferential flanges 34 formed on the spool 20 on either side of each composite sealing ring.

Figure 3:
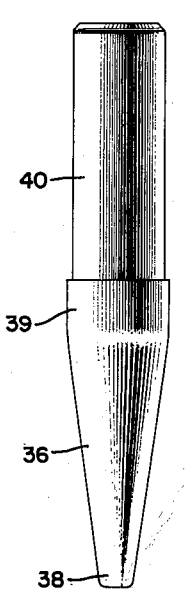
FIGURE 3 is a view in elevation of a portion of the sealing ring installing tool of the present invention.
Figure 4:
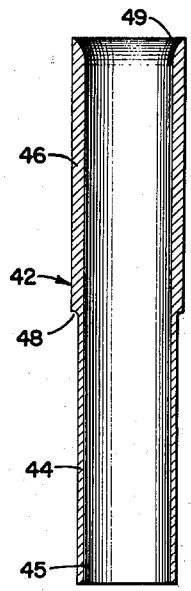
FIGURE 4 is a sectional view taken through the center of the sleeve of the sealing ring installing tool of the present invention.
Figure 5:
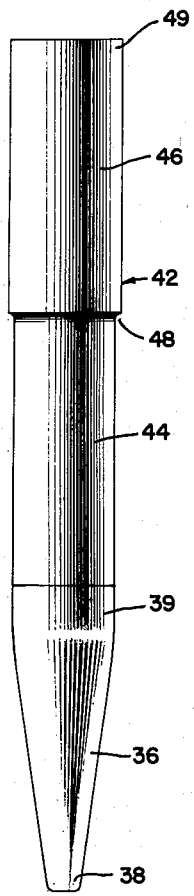
FIGURE 5 is a view in elevation illustrating the ring installing tool of the present invention with the parts of the tool illustrated in FIGS. 3 and 4 shown in assembled relation.

The tool which is utilized to install the sealing rings upon a valve spool or a similar cylindrical member is illustrated in FIGS. 3, 4 and 5. The portion of the tool which is utilized to enlarge the sealing rings to a size sufficient to permit their being passed over the enlarged portions of the spool 20 is illustrated in FIG. 3 and comprises a generally conical portion 36 which tapers at one of its ends to a blunt point 38. The taper of the conical portion 36 is sufficiently gradual that a large force is not required to enlarge the sealing rings by pushing them from the apex of the conical portion towards its base 39. A generally cylindrical portion 40 projects from the base 39 of the conical portion 36 and is approximately equal in length to the length of the conical portion. The diameter of the cylindrical portion 40 should be slightly larger than the diameter of the largest portion of the spool upon which the sealing rings are to be installed.

A generally cylindrical sleeve 42 which receives the sealing rings from the portion of the tool shown in FIG. 3 is illustrated in FIG. 4. The sleeve 42 comprises a thin-walled portion 44 having an open end 45 and extending for approximately one-half the length of the sleeve, and a portion 46, the wall of which is approximately twice the thickness of the wall of the portion 44. The abrupt change in the thickness of the wall of the sleeve 42 at the point where the portions 44 and 46 intersect forms a circumferential shoulder 48 which extends coaxially around the periphery of the sleeve. The sleeve 42 has an inside diameter which is only slightly larger than the outside diameter of the cylindrical portion 40 of the ring expander portion of the tool shown in FIG. 3. Thus, the sleeve 42 may be telescoped over the projection 40 in the manner shown in FIG. 5. Since the sleeve 42 is of substantially the same length as the ring expander portion of the tool, the cylindrical projection 40 will extend into the sleeve 42 for approximately one-half of its length when the two parts of the tool are assembled. It will also be apparent that the outside diameter of the portion 44 of the sleeve 42 is substantially equal to the diameter of the base 39 of the conical portion 36 of the ring expander. Thus, when the two parts of the tool are assembled as illustrated in FIG. 5, the external periphery of the thin-walled portion 44 of the sleeve 42 is coplanar with the external periphery of the base of the conical portion 36. At the end of the sleeve 42 at which the thickened wall portion 46 terminates, the internal wall of the sleeve 42 is tapered or flared outwardly as indicated by reference character 49.

Figures 2, 7:
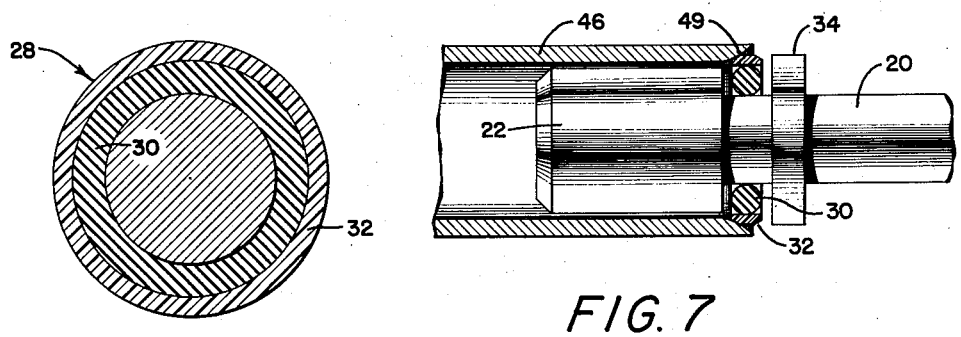
FIGURE 2 is a view in section taken through the center of a composite sealing ring comprising an inner ring of soft elastic material and an outer, glide, ring of relatively hard, resilient material.
FIGURE 7 is a view in section showing the manner in which the sleeve of the ring installing tool is utilized to compress the plastic glide rings of a composite sealing ring.
Figure 6:
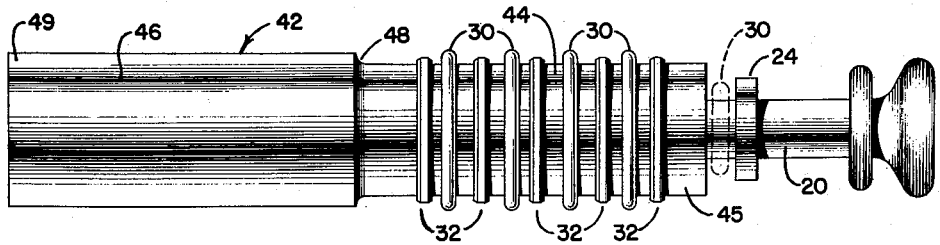
FIGURE 6 illustrates the manner in which the sleeve portion shown in FIG. 4 is utilized to install sealing rings upon a valve spool of the type shown in FIG. 1.

Use of the tool depicted in FIGS. 3, 4 and 5 for installing sealing rings upon a valve spool of the type depicted in FIG. 1 is illustrated in FIGS. 6 and 7. Since all of the structural elements appearing in the latter figures have been identified, further description of these figures will be deferred until the description of the method of using the device is considered.

*Operation*

In utilizing the method of the present invention, the two parts of the tool illustrated in FIGS. 3 and 4 are first formed according to the relative dimensions which have been described above. The sleeve 42 is then telescoped over the cylindrical projection 40 of the expander portion of the tool as shown in FIG. 5. Since the cylindrical projection 40 extends a substantial distance into the sleeve 42, the sleeve cannot become loose with respect to the expander portion and will be retained in position by frictional contact even when the tool is inverted so that the apex 38 of the conical portion points upwardly.

After the two parts of the tool are assembled in the manner shown in FIG. 5, the sealing rings to be applied are passed concentrically over the apex 38 of the conical portion 36. The sealing rings should be placed upon the conical portion 36 in an order inverse to that in which they will be applied or installed upon the spool 20. Thus, the sealing ring which will be first installed upon the spool 20 should be placed upon the conical portion 36 last. If composite rings utilizing an inner ring of soft, elastic material and a glide ring of resilient, relatively hard material are to be utilized, it will be apparent that the inner and outer (or glide) rings should be alternately placed upon the conical portion 36. Stated differently, when composite rings of the type shown in FIG. 2 are to be utilized, every other ring placed upon the conical portion 36 will be one of the plastic glide rings 32.

After as many rings as it is necessary to install have been placed upon the conical portion 36, the rings are all forced downwardly toward the base of the conical portion. In this manner the diameters of the rings are expanded until the rings obtain a size corresponding to the size of the base of the conical portion 36. The sealing rings are then pushed off of the ring expander part of the tool onto the sleeve 42. The thin-walled portion 44 of the sleeve 42 is of sufficient length to permit a number of the rings to be carried thereon, and the shoulder 48 prevents the rings from working down the sleeve 42 and inadvertently falling off of the end of the sleeve. When all of the rings have been pushed from the conical portion 36 onto the thin-walled portion 44 of the sleeve 42, the sleeve is detached from the cylindrical projection 40 and the spool 20 is removed from the vave body 10 and inserted in the end 45 of the sleeve 42.

The spool 20 is then positioned in the sleeve 42 so that the end 45 of the sleeve will be adjacent the position upon the spool 20 at which the first sealing ring is to be located. In FIG. 6, I have illustrated the arrangement of the spool 20 with respect to the sleeve 42 when a plurality of composite rings 28 of the type shown in FIG. 1 are to be installed. The end 45 of the sleeve 42 is positioned adjacent the first circumferential flange 34 of the spool 20 and the enlargement 24 at one end of the spool. The sealing ring closest adjacent the end 45 of the sleeve 42 is one of the internal elastic rings of relatively soft material. In the process of installation, this first ring is pushed from the end of the sleeve 42 and assumes the position illustrated in dashed lines between the enlargement 24 and first circumferential flange 34 (not seen). As illustrated in FIG. 6, the inner rings 30 are spaced alternately along the thin-walled portion 44 of the sleeve 42 with the glide rings 32. After the first inner ring 30 has been installed in its proper position upon the spool 20, its associated glide ring 32 is forced off the end 45 of the sleeve 42 and assumes a concentric position in relation to the inner ring 30 which has already been installed on the spool. After one composite sealing ring has been installed in its proper position on the spool 20, the sleeve 42 is repositioned relatively to the spool 20 so that its end 45 is brought into juxtaposition with respect to the next sealing ring position. The process of forcing the inner ring 30 and the glide ring 32 off the end 45 of the sleeve 42 is then repeated. The repositioning of the sleeve 42 with respect to the spool 20 and the installation of the inner and outer rings of the composite ring 28 are repeated until all of the rings have been installed upon the spool.

As has been previously explained, the utilization of composite sealing rings which are characterized by an external or glide ring constructed of Teflon, or similar high density resin material, has been characterized by a disadvantage resulting from the slow rate of recovery of the plastic from the deformation imparted to it in stretching it over the conical portion 36. Thus, after the inner rings 30 and glide rings 32 have been installed in their proper positions on the spool 20, it has previously been necessary to delay the reinsertion of the valve spool in the valve body 10 until the glide rings have "shrunk" sufficiently to fit within the bore 12 of the valve body 10. The tool of the present invention enables the restoration of the glide rings 32 to their unstressed dimensions to be expedited. In order to utilize the tool for this purpose, it is only necessary to insert one end of the spool 20 in the end 49 of the sleeve 42. The gradual outward taper of the internal wall of the sleeve 42 at its end 49 permits the glide ring 32 to be biased inwardly as the sleeve 42 is forced farther upon the spool 20. It will be apparent, of course, that after the glide ring 32 which is most nearly adjacent the end of the spool 20 has been forced inwardly toward the spool, the spool may be moved farther into the sleeve 42 and the succeeding glide rings located along the length of the spool 20 may be compressed in the same manner. Thus, in a very short period of time, the spool 20 with its newly installed composite rings 28 is ready for reinsertion in the valve body 10.

From the foregoing description of the invention, it will be apparent that the method and tool described herein provide a means of expeditiously and safely installing annular rings upon a cylindrical body. Because of the irregularities which are existent in the structural configuration of valve spools and the like, the invention is particularly well adapted for installing sealing rings upon mechanical components of that type. The dimensions of the tool are such that a number of such rings can be installed in one operation and the tool is further designed to permit the expeditious installation of composite sealing rings which include an inner ring of relatively soft elastic material and an outer ring of resilient hard material.

Changes may be made in the combination and arrangement of parts or elements, as well as in the steps and procedures as heretofore set forth in the specification and shown in the drawings, it being understood that changes may be made in the precise embodiment disclosed without departing from the spirit and scope of the invention as defined in the following claim.

I claim:

A method for installing a plurality of sealing rings upon a generally cylindrical member having portions of larger diameter than the portions which are to carry said sealing rings, each sealing ring comprising a relatively soft elastic O-ring around which is disposed a relatively hard, resilient glide ring, the method comprising the steps of:

successively elastically expanding and sliding a resilient glide ring, an elastic O-ring, a resilient glide ring, and an elastic O-ring over a conical body and onto one end of a cylindrical sleeve;

telescoping said one end of the cylindrical sleeve over a first end of the cylindrical member until said one end is disposed adjacent the portion between the larger diameter portions for carrying a sealing ring which is furthermost from said first end of the cylindrical member;

sliding the expanded elastic O-ring off the end of the cylindrical sleeve and allowing said O-ring to contract into the portion of the cylindrical member between the larger diameter portions;

sliding the expanded glide ring off the end of the cylindrical member and allowing said glide ring to contract onto said O-ring on said cylindrical member;

withdrawing the cylindrical sleeve from the cyindrical member until said one end of the cylindrical sleeve is positioned adjacent the next successive portion between the larger diameter portions of the cylindrical member for carrying a sealing ring;

sliding the next successive expanded elastic O-ring off the end of the cylindrical sleeve and allowing said O-ring to contract into the portion of the cylindrical member between the larger diameter portions;

sliding the next successive expanded glide ring off the end of the cylindrical member and allowing said glide ring to contract onto said O-ring on said cylindrical member; and, removing the cylindrical sleeve from the cylindrical member and forcing the other end of the cylindrical sleeve over the glide rings positioned on the O-rings on the cylindrical member to compress the glide rings onto the O-rings.

References Cited in the file of this patent

UNITED STATES PATENTS

| | | |
|---|---|---|
| 1,395,140 | Reed | Oct. 25, 1921 |
| 1,968,640 | Elms | July 31, 1934 |
| 2,086,371 | Tear | July 6, 1937 |
| 2,619,964 | Thaete | Dec. 2, 1952 |
| 2,739,374 | Kaiser | Mar. 27, 1956 |
| 2,840,896 | Edwards | July 1, 1958 |
| 2,968,864 | Lee | Jan. 24, 1961 |